United States Patent [19]

Novik

[11] Patent Number: 5,432,871
[45] Date of Patent: Jul. 11, 1995

[54] SYSTEMS AND METHODS FOR INTERACTIVE IMAGE DATA ACQUISITION AND COMPRESSION

[75] Inventor: Dmitry A. Novik, Washington, D.C.

[73] Assignee: Universal Systems & Technology, Inc., Arlington, Va.

[21] Appl. No.: 101,057

[22] Filed: Aug. 4, 1993

[51] Int. Cl.⁶ .............................................. G06K 9/36
[52] U.S. Cl. .................................... 382/232; 382/254; 364/413.22; 348/17; 348/384
[58] Field of Search ........................ 382/61, 62, 54, 56, 382/6; 358/262.1, 436, 439, 442, 447, 453; 348/13, 17, 438, 408, 384, 399; 304/413.02, 413.22, 413.13; 128/903, 904

[56] References Cited

U.S. PATENT DOCUMENTS

| | | | |
|---|---|---|---|
| 4,222,076 | 9/1980 | Knowlton | 348/384 |
| 4,633,326 | 12/1986 | Endoh et al. | 358/442 |
| 4,682,869 | 7/1987 | Itoh et al. | 358/260 |
| 4,692,806 | 9/1987 | Anderson et al. | 348/399 |
| 4,777,598 | 10/1988 | Kellar et al. | 364/413.22 |
| 4,870,497 | 9/1989 | Chamzas et al. | 358/426 |
| 4,903,317 | 2/1990 | Nishihara et al. | 382/56 |
| 4,949,049 | 8/1990 | Botti | 330/124 R |
| 4,999,715 | 3/1991 | Porcellio et al. | 358/433 |
| 5,042,077 | 8/1991 | Burke | 364/413.22 |
| 5,058,186 | 10/1991 | Miyaoka et al. | 382/62 |
| 5,128,776 | 7/1992 | Scorse et al. | 358/426 |
| 5,164,831 | 11/1992 | Kuchta et al. | 358/432 |
| 5,166,987 | 11/1992 | Kageyama | 382/56 |
| 5,189,526 | 2/1993 | Sasson | 358/432 |
| 5,202,935 | 4/1993 | Kanamori et al. | 382/17 |
| 5,204,756 | 4/1993 | Chevion et al. | 358/426 |
| 5,249,066 | 9/1993 | Fukuda et al. | 358/261.1 |
| 5,272,760 | 12/1993 | Echerer et al. | 364/413.22 |
| 5,291,401 | 3/1994 | Robinson | 364/413.13 |
| 5,297,034 | 3/1994 | Weinstein | 382/6 |
| 5,321,520 | 6/1994 | Inga et al. | 358/403 |

OTHER PUBLICATIONS

Advanced Imaging Magazine, "Sending Images Through The Air: Image Transmission By Radio", Mar. 1993.

*Primary Examiner*—Leo H. Boudreau
*Assistant Examiner*—David R. Anderson
*Attorney, Agent, or Firm*—Sixbey, Friedman, Leedom & Ferguson; Gerald J. Ferguson, Jr.; Evan R. Smith

[57] ABSTRACT

An interactive image data transmission system uses the expertise of an image end user distant from the image collection point. An image with a wide angle field of view is transmitted to the end user in lossy-compressed form. The image is displayed at the receiving end with errors introduced by the lossy compression. The end user can select and specify a narrowed field of view, and the image capturing parameters are modified as necessary under end user control to capture a desired image of the narrow view field. The transmitting station transmits a lossy compressed version of the narrow view image which is displayed for the user, and the user selects at least one window of definite interest within the image. Then, additional image data sufficient to provide a correct display within the window(s) of interest is transmitted to the receiving station and the display is updated within the window(s). The additional data may be difference data in a variable length diagonal code.

51 Claims, 2 Drawing Sheets

SYSTEMS AND METHODS FOR INTERACTIVE IMAGE DATA ACQUISITION AND COMPRESSION

FIELD OF THE INVENTION

The present invention relates to a system and method for efficient interactive transmission of image data.

BACKGROUND OF THE INVENTION

It is often desirable to obtain image data of an area of interest and transmit the image data to a person having specialized knowledge, who can then review the image data and make a final decision on the basis of such review. Such transmission of image data is desirable in many civilian and military applications. For example, it may be desirable to transmit the following types of images to a remote location for review: medical images (teleradiology), archived scientific images, fingerprint and forensic images, images captured by spacecraft, satellite images of Earth, unmanned vehicle images, security camera output, air and vehicular traffic control images, military reconnaissance images, battlefield inspection images, and remote targeting images.

In prior art systems, a collected image was most often collected and transmitted automatically, according to a predetermined protocol. In transmitting image data, it is necessary to provide a remotely located reviewer with an image of sufficient detail so that the desired information can be extracted. Therefore, an image is normally broken down into a very large number of picture elements or "pixels" and transmitted over a communications channel. Unless the channel has a particularly high channel capacity, the transmission of a detailed image in this manner can take a significant amount of time, and as a result the cost of delivery will be increased.

To reduce image transmission time, earlier systems used data compression techniques. Data can be compressed in a lossy form (i.e. some information is lost due to compression) or in a lossless form in which no original image information is lost in the compression and subsequent expansion process. U.S. Pat. No. 4,903,317 to Nishihara et al. shows an image processing apparatus for medical diagnosis that uses both lossy and lossless compression in a Huffman code technique. The Nishihara patent shows a circuit with a memory for storing image data, a loss-compression circuit, an expansion circuit for expanding the loss-compressed data, and a difference circuit for calculating the difference between the original image data of the image memory and the expanded image data of the expansion circuit. The difference data is lossless-compressed and combined with the lossy-compressed main data to produce a combined compressed data set that can be transmitted or stored, and later decompressed without any loss of original image information. However, Nishihara does not provide any sequential transmission of differently-compressed data or any interaction between a remotely located expert and the compression and transmission system.

Another earlier system allowed a transmitting operator to vary the resolution of the image being transmitted. U.S. Pat. No. 5,128,776 to Scorse et al. shows a prioritized image transmission system for processing and transmitting video imagery. The operator of the imaging system selects desired portions of the video image for transmission to a remote reviewer with operator-selected levels of resolution, compression and order of transmission. The Scorse-type system is further discussed in the March, 1993 issue of Advanced Imaging Magazine in an article by James Scorse titled "Sending Images Through the Air: Image Transmission by Radio." Like systems of the Nishihara type, the Scorse-type system does not permit the remotely located expert to control the acquisition or the detail level of the information being transmitted to minimize the amount of data that must be transmitted.

U.S. Pat. Nos. 4,682,869 to Itoh et al.; 4,870,497 and 4,979,049 to Chamzas et al.; 4,999,715 to Porcellio et al.; 5,166,987 to Kageyama; 5,189,526 to Sasson; and 5,204,756 to Chevion et al. show other systems performing image transmission or compression functions.

In his study of image data transmission techniques, the inventor has identified a need for a system that radically decreases the transmission time and cost of transmitting images for remote analysis. Since typically only a small portion of any image is of significant interest to the reviewer, accurate transmission of the entire image is not necessary. However, none of the prior art systems make use of the knowledge of the expert (end user) receiving the image to maximize the efficiency of image transmission.

SUMMARY OF THE INVENTION

Therefore, it is a broad object of the present invention to provide an improved system for acquiring and transmitting image data that radically decreases the transmission time and cost of transmitting images for remote analysis.

Another broad object of the present invention is to provide an interactive system for acquiring and transmitting image data in which a remotely located expert image reviewer controls a series of transmissions from an image source at selectable compression levels and imaging parameters to efficiently obtain particular desired information. Any image parameters can be varied under the control of the end user, such as direction of data capture, resolution, zoom, and the spectral range monitored, among other imaging parameters.

It is a further broad object of the present invention to provide an interactive image data transmission system wherein an expert image reviewer receiving an image at a remote location can control a series of transmissions from an image source to efficiently obtain particular desired information.

Another broad object of the present invention to provide an improved method for acquiring and transmitting image data that radically decreases the transmission time and cost of transmitting images for remote analysis.

It is another broad object of the present invention to provide an interactive method for acquiring and transmitting image data in which a remotely located expert image reviewer controls a series of transmissions from an image source at selectable compression levels and imaging parameters to efficiently obtain particular desired information. Any image parameters can be varied under the control of the end user, such as direction of data capture, resolution, zoom, and the spectral range monitored, among other imaging parameters.

It is a further broad object of the present invention to provide an interactive image data transmission method wherein an expert image reviewer receiving an image at a remote location can control a series of transmissions from an image source to efficiently obtain particular desired information.

Another object of the invention is to provide an improved method of transmitting image data which combines lossy compression and lossless compression.

A further object of the invention is to provide an improved system for transmitting image data which combines lossy and lossless data compression schemes.

Another object of the invention is to provide an improved interactive method of obtaining and/or transmitting image data in which an end user obtains the information of interest through an iterative process.

It is also an object of the invention to provide an improved interactive system for obtaining and/or transmitting image data in which an end user obtains the information of interest through an iterative process.

An important object of the invention is to provide a process for transmitting image data where a lossy transmission is provided and difference data is then transmitted to make the received image data lossless in specified areas of interest.

Another significant object of the invention is to provide a system which transmits image data using lossy transmission and then transmits difference data to make the received image data lossless in specified areas of interest.

Another object of the present invention is to provide a process for collecting and/or transmitting image data where difference data is specified using a variable length diagonal code.

It is a further object of the present invention to provide a system for collecting and/or transmitting image data where difference data is specified and transmitted using a variable length diagonal code.

These objects and others are achieved in the present invention by transmitting and interactively selecting image data from a remote source, using both lossy and lossless compression schemes, and to an apparatus for performing the method. The professional expertise of the reviewer of the image data is used to manage the acquisition and transmission of the image data, thus minimizing the volume of information to be transmitted and making the most effective possible use of the image data communications channel.

An apparatus for performing the invention includes a transmitting station with a controllable digital image data source and an image compression processing computer system. The transmitting station is connected to a receiving station by at least one communications channel. Image data is carried from the transmitting station to the receiving station, and control signals are carded from the receiving station to the transmitting station. The receiving station has an image decompression processing computer system, a display, and a user input device.

In a preferred embodiment, the system operates according to a novel interactive method. The first step is capturing an image with a wide angle field of view. Then, in a "quick look" stage, the wide angle image is compressed using a lossy compression scheme and transmitted to a distant user in a lossy-compressed, reduced-accuracy form. Preferably, the image quality factor of the lossy compression is chosen by an expert viewer (end user) such that image errors and artifacts introduced by the lossy compression and decompression do not interfere with the expert viewer's detection and selection of the narrow field of view of interest. The image is decompressed at the receiving end and displayed with errors introduced by the lossy nature of the compression. An expert viewer at the receiving end selects a more narrow field of view of interest from the error-containing image, and transmits the coordinates of the desired narrow field back to the remote source. The image capturing equipment is then adjusted as necessary (orientation, aim, zoom, focus, color v. black and white, spectral response, etc.) to capture an increased quality image of the more narrow field area selected by the user. The transmitting station stores the narrow field image in memory and transmits a lossy compressed version of this image. This image is decompressed and displayed for the receiver, with errors introduced by the lossy compression and subsequent decompression. The reviewer selects areas on this image that define a window or windows of definite interest. A specification of the place and shape of the window is then conveyed to the transmitting station. Then, the transmitting station processes the image stored in memory and transmits additional image data sufficient to enhance the image until it is of lossless quality within the window of interest. In a preferred embodiment, difference data is transmitted using a variable length diagonal code. The receiving station uses additional image data received (such as difference data) to correct the compression-generated errors, thus providing an accurate lossless display within the window(s) of interest.

DETAILED DESCRIPTION OF THE PREFERRED EMBODIMENTS

Figure 1:
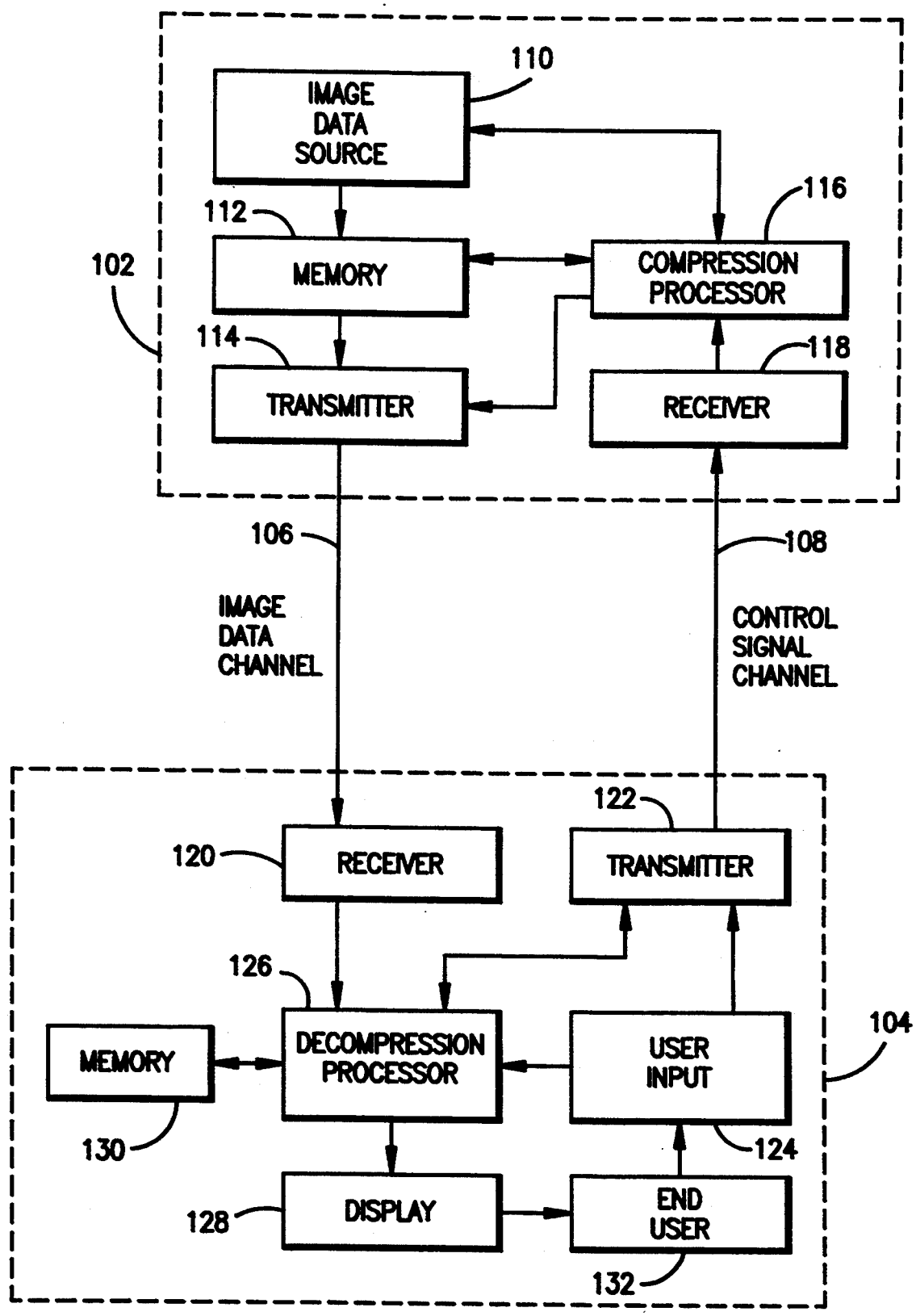
FIG. 1 is a block schematic diagram showing an image data transmission apparatus and a remotely located data review and control location, linked by image data transmission and control channels, according to the present invention.

The present invention relates generally to a method for acquiring, transmitting and interactively selecting remote image data using both lossy and lossless compression schemes, and to an apparatus for performing the method. The invention will be described first with reference to FIG. 1, which is a block schematic diagram of one preferred apparatus for performing interactive image data transmission according to the present invention. FIG. 1 shows data collection and transmitting station 102 and control and receiving station 104. Transmitting station 102 and receiving station 104 are connected by an image data transmission channel 106 in the direction from the transmitting station 102 to the receiving station 104. The stations are also connected by a control signal channel 108 in the direction from receiving station 104 to transmitting station 102. Channels 106 and 108 may be implemented as a single channel.

Transmitting station 102 comprises an image data source 110, a memory 112, a transmitter 114, a compression processor 116, and a control signal receiver 118. Control signal receiver 118 is connected to receive control signals from receiving station 104 over control signal channel 108, and is connected to provide these signals to compression processor 116. Image data source 110 is connected for information interchange with compression processor 116 and is also connected to memory 112. Memory 112 is connected to provide data to transmitter 114 and is connected for information interchange with compression processor 116. Compression processor 116 is connected to provide control and information signals to transmitter 114.

Receiving station 104 comprises an image data receiver 120, control signal transmitter 122, user input 124, decompression processor 126, display 128, and memory 130, all controlled by an end user 132. Image data receiver 120 is connected to transmit received data to decompression processor 126. Decompression processor 126 is connected to receive signals representing user commands from user input 124. Decompression processor 126 is also connected for data interchange with memory 130 and to transmit processed image information to display 128 for viewing.

Image data source 110 is a device for providing digital image data. The image data provided by image data source 110 may be data captured in real time. Alternatively, previously stored image data may be retrieved from a storage device and transmitted to a recipient. As examples, image data source 110 may be a video camera with a digital frame grabbing output, an electronic digital camera, a medical imaging system, a satellite imaging system, a digitizing scanner for digitizing printed or other non-digital images, an image storage and retrieval system, or any other device for providing an image representation in digital form.

The image data provided represents an image which is to be collected at one location and transmitted to another location for analysis. Examples include medical images for use in teleradiology, archived scientific images for use in research, fingerprint or forensic images, images captured by deep space probes, satellite images of Earth, guidance images from unmanned vehicles, security camera output, air or vehicular traffic control images, military reconnaissance images, battlefield inspection images, and remote targeting images.

As noted above, to facilitate compression and transmission, the image data is preferably provided in digital form by image data source 110. If the image exists in printed or other non-digital form, the entire image should be converted to digital form, such as by using a computer scanner or a video camera attached to a digitizing computer, to obtain the desired wide angle digital image data. Image data source 110 preferably has a resolution compatible with the display resolution of the remote viewer's display 128.

It is desirable for aiming, focus, and zoom functions in the image collection process to occur under control of compression processor 116. For example, if a medical or satellite image is being processed, it will be desirable to interface compression processor with the medical imaging system or the satellite image collection system so that the region imaged, and thus the resolution of particular objects of interest, can be varied under control of the compression processor 116. If a scanner or video (still image) capture device is used as part of image data source 110, it will be desirable to connect the scanner or video capture device so that it can zoom in on desired subparts of the total image, thus resolving a part of the image in greater detail when desired, in response to signals from compression processor 116.

Image data channel 106 may be any desired communications channel, and transmitter 114 and receiver 120 are constructed appropriately for the desired image data channel 106. Image data channel 106 will be used to transmit digital image data, and is preferably a relatively fast and accurate channel. As examples, image data channel 106 may be a radio or microwave transmission channel, a landline telephone link, a cellular radiotelephone link, a local area network link, a satellite link, or a dedicated hardwired link. In each case, a compatible transmitter 114 and receiver 120 will be provided depending on the desired communications channel. For example, if a landline telephone link is used, transmitter 114 and receiver 120 may be a high speed data modulator and a high speed data demodulator, respectively.

Control signal channel 108 may also be any desired communications channel, and the transmitter 122 and receiver 118 are compatible with the control signal channel 108. In general, control signal channel will be used to transmit a relatively small amount of control data. Therefore, control signal channel 108 need not be a high speed channel.

As noted before, both the image data channel 106 and the control signal channel 108 may be implemented as a single asymmetrical communications channel for which separation of the image data and control signal channels is accomplished through bandwidth or time multiplexing.

While image data channel 106 and control signal channel 108 are shown as separate channels, the system is designed to be interactive, and in most cases only one channel will be in use at once. Therefore, a single bidirectional channel may be used if desired to provide the functions of both image data channel 106 and control signal channel 108. As an example, if a single landline telephone channel is used for both image data channel 106 and control signal channel 108, a high speed bidirectional data modem can be used to perform the functions of transmitter 114 and receiver 118 at the transmitting station end, and another high speed modem could perform the functions of receiver 120 and transmitter 122 at the receiving station end.

If a single channel is used, the channel may either be half duplex or full duplex. If a :full duplex channel is provided, the bandwidth allocated to the transmission of image data from transmitting station 102 to receiving station 104 may be greater than the bandwidth allocated to control signal transmissions on control signal channel 108, if desired, since traffic on the image data channel 106 will be much heavier. A half duplex channel will also provide satisfactory operation, and is preferred for this reason, since the control signals to be transmitted will generally only be transmitted when a requested image data transmission has been completed. Thus, the image data and control feedback signals are normally separated in time and are not transmitted simultaneously.

Memory 112 and compression processor 116 of transmitting station 102 may be implemented using a digital computer, such as an IBM compatible personal computer or another appropriate computer system. Compression processor 116 will be provided with software which controls the functions of the image data source 110, memory 112, and transmitter 114. The software in compression processor 116 will also provide data compression, selection, and transmission functions in response to commands received over control signal channel 108 by receiver 118, in a manner which will be explained in detail below with reference to FIG. 2.

Similarly, the decompression processor 126, display 128, memory 130, and user input 124 of receiving station 104 can be implemented using a digital computer such as an IBM compatible personal computer or another computer system of requisite power and flexibility. User input 124 may include a keyboard and pointing devices such as a mouse and/or a touch screen. A program (software or firmware) in decompression processor 126 will control the functions of display 128, which may be a high resolution color display associated with the computer, memory 130, and transmitter 122. The program in decompression processor 126 will provide data decompression, image storage, image display, and data combination functions in response to user input and the image data received from receiver 120, in a manner which will be explained in more detail with reference to FIG. 2.

The decompression processor 126 and the compression processor 116 can also be implemented as dedicated special purpose circuits, rather than using programmable general purpose computers.

Figure 2:
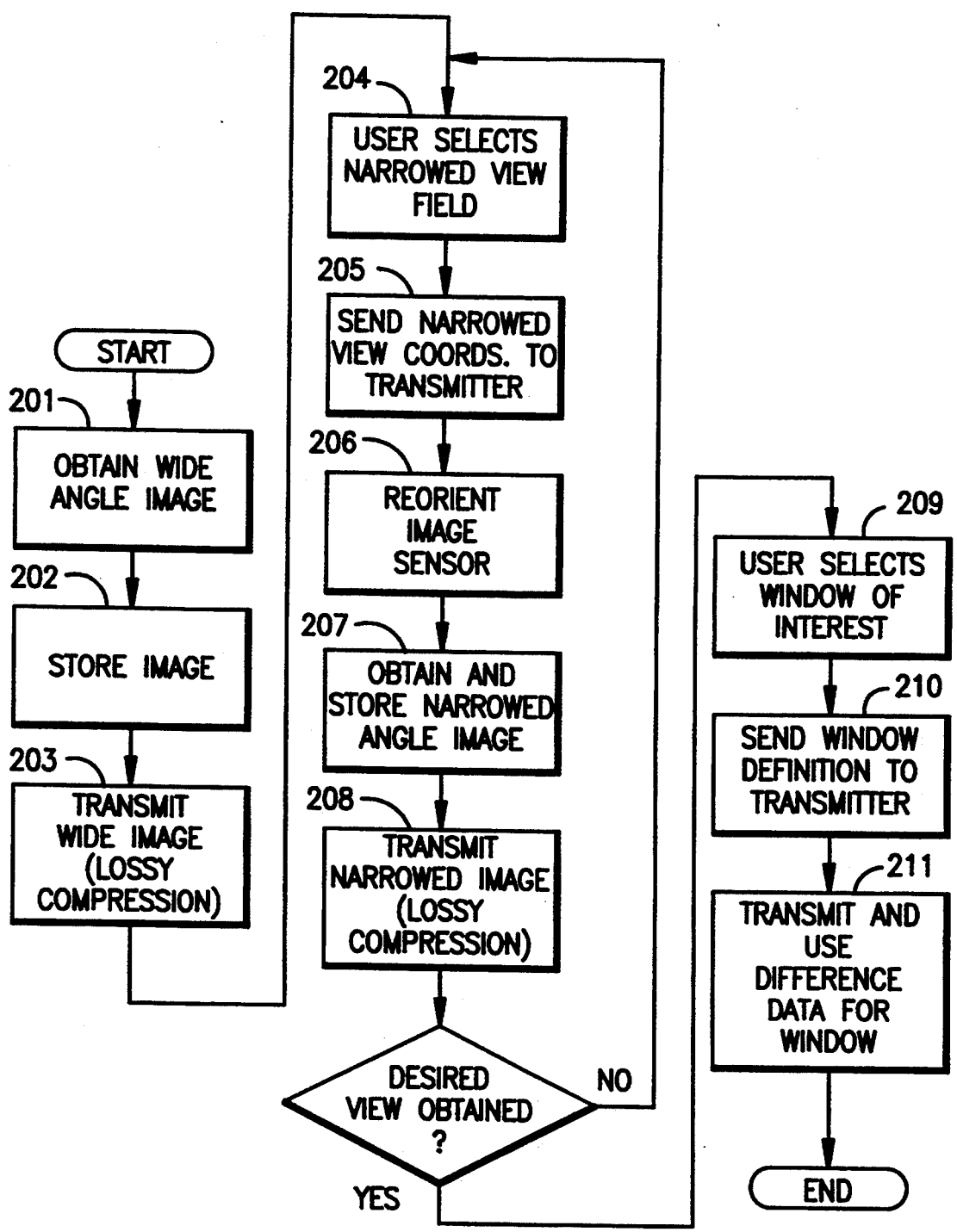
FIG. 2 is a flowchart showing the steps of an image data acquisition, compression and transmission scheme according to a preferred embodiment of the present invention.

FIG. 2 is a flowchart of the preferred operation of the present invention, and will be explained with reference to the apparatus of FIG. 1, although other appropriate apparatus may be substituted in performing the inventive method. The image data acquisition and compression process of the present invention is preferably initiated by an end user who seeks to examine particular image data available through the system. When the end user has initiated operation, in Block 201, an image is captured with a relatively wide angle field of view by image data source 110 (shown in FIG. 1). The image may be captured in real time using an electronic digital camera or other digital image sensor, or the image can be digitized from previously collected, e.g. archived data. The image to be transmitted may be, for example, a medical image for use in teleradiology, an archived scientific image for use in research, a fingerprint or forensic image, an image captured by a deep space probe, a satellite image of Earth, an image from an unmanned vehicle, an electronic digital camera output, a security camera output, an air or vehicular traffic control image, military reconnaissance image, battlefield inspection image, remote targeting image, or any other image which is to be collected at one location and transmitted to another location for analysis. The image capture procedure is preferably carried out under the control of software associated with compression processor 116 (shown in FIG. 1).

In systems where multiple images or multiple sources are available, the image to be transmitted and the timing of transmission may be selected by an expert user at the receiving station through control signals transmitted over control signal channel 108.

Next, as shown in Block 202, the image data may be stored in a memory at the source location to facilitate compression operations and further transmission processing.

In Block 203, which is appropriately referred to as the "quick look" stage, the wide angle image is compressed by compression processor 116 using a lossy compression scheme, preferably a JPEG Discrete Cosine Transform (DCT) scheme, and transmitted to a distantly located expert reviewer in a lossy-compressed form. The lossy compression scheme used preferably maintains the original resolution of the image, but compresses the data defining the image to such a large extent that some information defining the image is lost in the compression process. That is, when the image data is decompressed at the receiving end, the resulting image will have the original resolution, but the color (or brightness) of some of the individual pixels may be erroneous in the decompressed image.

In the preferred method, the end user controls all output parameters of the image source, including its direction, angle of view, spatial and amplitude resolution, mode of imaging (monochrome, color multispectral, etc.) and quality factor Q of the lossy compressed/decompressed image. In the case of using a lossy compression such as the JPEG DCT technique, an image quality factor Q in the range between about 20 and about 90 is preferred. As Q becomes larger, the compression factor is reduced and the image quality of the compressed/decompressed image increases. As Q is reduced, the compression factor increases and the quality of the compressed/decompressed image is degraded.

The lossy compressed image data is transmitted over image data channel 106 to receiver 120 in receiving station 104 (all shown in FIG. 1). Preferably, this transmission takes place with error detecting and/or correcting protocols, so that the only errors in the image at the receiving end are errors arising from the compression process, and not from channel interference.

The use of lossy compression at this stage of transmission minimizes the time required for image transmission to the receiving station, while providing enough image accuracy to permit selection of a more narrow field of interest within the image by the end user, which is the goal of this initial stage of the image transmission. The user, knowing what type of image data he or she is requesting, can select an appropriate Q factor for the transmission depending on what level of detail is required to select a particular area of interest according to the procedure described below.

Next, in Block 204, the image data is decompressed at the receiving end (such as by decompression processor 126 shown in FIG. 1) and the decompressed image, with some error due to the lossy nature of the compression, is displayed for an end user 132 interested in the image (such as on display 128 shown in FIG. 1). At this stage, there is interaction between the transmitting station 102 and the receiving station 104. The expertise of the end user 132, and particularly his visual recognition capability as a human being, is employed to select an area of particular interest in the image. The selection made defines a "narrow field of view" which specifies a desired reorientation of the image gathering system to focus on a more limited area of the image, so that the area of interest can be more precisely resolved. As an example, the entire image may be a picture of a large building. The narrow field of view might be a single floor of the building, while the ultimate area of interest might be a single window on the floor. As another example, a full image might be an X-ray of an entire foot. The narrow field of view might be the part of the foot near the toes, and the ultimate area of interest might be a single toe within the narrow field of view.

In Block 205, information defining the narrow field of view is transmitted back to the transmitting station (such as by transmitter 122 over control signal channel 108, both shown in FIG. 1). The defining information may take on several forms depending on the flexibility desired and the imaging equipment provided. In some applications, such as for archival research, it may be entirely satisfactory to provide only a single zoom level for the narrow field of view. In this case, the narrow field of view can be defined by an X and Y coordinate representing the center of the narrowed region for review. The image collection device can then be centered on the coordinates provided and the zoom adjusted to the predetermined level. In other applications, variable detail or "zoom" levels may be provided, or other imaging parameters may be varied, such as spectral response, image capture direction, and resolution. In this case, more information is necessary to specify the changes desired to image the narrow field of view. A desired zoom setting can be directly transmitted, or additional coordinate information defining a region rather than a single point may be transmitted, from which a required zoom setting can be derived by the transmitting station. For example, a radius of a circle centered at the X, Y coordinates could be transmitted, with the circle defining the narrow field of view. Two sets of rectangular coordinates could also be transmitted to define opposite corners of a box defining the narrow field of view. Parameters specifying changes in the type or response of the image sensor, such as resolution, color, and spectral response, can also be transmitted.

In Block 206, the compression processor 116 (shown in FIG. 1) receives the narrow view field defining information and reorients the image data source 110 to produce a more highly directed image of the interesting part of the image as determined by the remotely located image user. The reorientation of the image sensor may be an actual adjustment of aim, zoom and focus, in the case of a video camera or other adjustable image sensor operating in real time. Alternatively, in cases where the image data source 110 is a "virtual sensor" which is merely providing data from an archival storage, the image data source 110 provides the compression processor 116 with more detailed data for the narrowed field of view.

As shown in Block 207, the narrow angle image is obtained by the compression processor 116 from image data source 110 and the narrow angle image data is stored in memory 112. Storage of the image data at this point in the process is particularly advantageous, since this storage gives compression processor 116 a record of the narrow angle image that will be transmitted. As will be seen, the ability to further process this image and predict the image decompressed by the receiving station will be useful in minimizing the amount of image data to be transmitted.

In Block 208, the compression processor 116 operates on the narrow angle image data to lossy compress the data, using the same lossy data compression methods described above, and transmits the lossy compressed narrow angle image data over image data channel 106 to the receiving station 104. A different compression ratio (Q factor) may be specified by the end user. The decompression processor 126 decompresses the image data, record the data in memory 130, and displays the narrow field image obtained for the expert user. Thus, each time the image field is made more narrow, more detail is provided in the displayed image.

As shown in the flowchart, the process steps represented by Blocks 204 through 208 can be repeated, as many times as necessary, to define a narrow field of view at the desired resolution. In the case of satellite image data, the available range of resolution of an image is very large. For example, an image data set could be viewed at a wide angle where individual states can be resolved, or at succeedingly narrow angles where individual structures on individual streets can be seen. When such a large range of possible resolution levels is available, selection of the ultimate area of interest may require a series of reorientation steps rather than a single reorientation step. Also, the reorientation steps can be omitted in particular cases where the initial image transmission has the desired resolution, or where no increase in resolution is possible through reorientation of the image data source. In such cases, the ultimate window of interest may be selected directly from the initially transmitted image without any reorientation step.

When the desired narrow field of view has been obtained, control transfers to Block 209, and the user at the receiving station can then select areas, by operating user input 124, on the narrow field image to define a window of definite interest. As noted above, user input 124 preferably includes a pointing device such as a mouse or touch screen to facilitate this selection process. The window of interest can be specified by designating coordinates and/or dimensions of the window, depending on the desired configuration of the window. Irregularly shaped windows can also be defined by marking particular groups of pixels. Finally, it is also possible for the user to define multiple windows of interest in the same manner described for defining an individual window of interest.

In Block 210, information defining the window of definite interest is transmitted by transmitter 122 over control signal channel 108 to the transmitting station 102. The information transmitted to define the window of definite interest can be varied depending on the configuration of the window of interest. For example, X and Y coordinates and a radius of a circle centered at the X, Y coordinates could be transmitted, with the circle defining the window of definite interest. Two sets of rectangular coordinates could also be transmitted to define opposite corners of a rectangular area defining the window of interest. Irregular windows of interest may also be selected by transmitting a mask defining the window of interest, and multiple windows of interest can be specified.

Then, in Block 211, the compression processor 116, based on the received information about the position of the window of interest selected by the end user, sends through transmitter 114 additional image data which provides enough image data on the receiver side to enhance the image quality until the quality at the receiver side is identical to the quality at the transmitter (lossless). However, the supplemental image data is provided by the transmitter only for the window of interest.

There are two ways to transmit the additional image data. First, the original data in the windows of interest could be transmitted in full. Second, residual image data (e.g. data that must be combined with the previously transmitted data to establish the corrected image) could be transmitted. Lossless data compression may also be applied to either of these methods. The most preferable method is to transmit only residual image data and also to losslessly compress this data for further gains in efficiency.

As an example, compression processor 116 may perform a simulated decompression operation on the narrow field image data stored in memory 112 to determine which pixels in the specified window of definite interest are displayed incorrectly at the receiving station 104. The compression processor 116 then activates transmitter 114 to transmit difference data specifying only the changes required to correct the erroneous pixels and thereby produce a lossless, accurate reproduction of the original image, and only within the specified window of interest. This difference data is preferably transmitted using a variable-length diagonal code, which is particularly advantageous for this purpose because of the predicted probability distribution of error and the limited nature of the image transmission alphabet. In the variable length diagonal code, each symbol has a different length, and the lengths of the symbols are consecutive. For example, a code with N symbols may be made up of symbols with lengths 1, 2, 3, ... N. The variable length diagonal code has an open structure, so it is possible to dynamically augment the alphabet of symbols by adding a new symbol with length N+1.

Thus, the method of the present invention minimizes the amount of image data transmitted over the image data channel 106 by facilitating interactive control, thereby taking advantage of the expertise of the end user of the image data. The basic image is transmitted in a lossy compressed form to minimize transmission overhead. Then, errors arising from the lossy compression are corrected only in the areas of definite interest within the image. This correction operation similarly minimizes transmission overhead by transmitting only minimal encoded correction information, rather than losslessly retransmitting the image data set in the areas of interest, which would involve significantly more transmission time.

Thus, an apparatus and method have been disclosed for interactively obtaining image data. The system and method disclosed is easy to use and minimizes image transmission time while providing complete and accurate detail in the locations where accuracy is needed. The system and method disclosed are particularly useful in optimizing image transmission operations over transmission channels with relatively lower speeds and bandwidths which would otherwise be unacceptable for transmitting detailed image data for remote review.

I claim:

1. An interactive method of transmitting detailed image data to a user over a communications channel extending between a transmitting station and a receiving station, comprising the steps of:

transmitting a user request for image data to the transmitting station;

obtaining a digitized image data set in a computing device at the transmitting station, said image data set defining an image with a spatial resolution;

performing a lossy compression operation on the digitized image data set, using the transmitting station computing device, to produce a lossy compressed image data set;

storing the lossy compressed image data set at the transmitting station;

transmitting the lossy compressed image data set to a computing device at the receiving station with the same said spatial resolution as the digitized image data set;

decompressing the lossy compressed image data set at the receiving station, using the receiving station computing device, to produce a lossy decompressed image data set;

displaying the lossy decompressed image data set on a display device visible to the user at the receiving station, in the form of an image having the said spatial resolution;

providing an input device permitting the user at the receiving station to select at least one window of interest within the displayed image data set;

monitoring the input device to receive a user selection of the window of interest and transmitting information defining the window of interest to the transmitting station;

transmitting, from the transmitting station to the receiving station, additional image data pertaining exclusively to the image within said window of interest, but inhibiting the performance of this step until the user interactively requests an accurate reproduction of the original image data in the currently selected window of interest;

using said additional image data received at the receiving station after the user requests an accurate reproduction of the original image data in the currently selected window of interest, enhancing the displayed image within the window of interest to produce a display within the window of interest which accurately reproduces the original digitized image data set, while maintaining the same said spatial resolution in the window of interest.

2. The method of claim 1 wherein the user request for image data includes a specification of initial image transmission parameters.

3. The method of claim 2 wherein the user request for image data specifies a desired image quality of the lossy compressed image data set.

4. The method of claim 3 wherein the user request for image data specifies a variable data compression ratio for initial data transmission.

5. The method of claim 2 wherein the user request for image data specifies a first spectral response for the initial image and including the further steps of:

receiving a user input selecting a second spectral response different from said first spectral response and transmitting information requesting said second spectral response to the transmitting station; and transmitting, from the transmitting station to the receiving station, additional image data for said window of interest to provide a display having said second spectral response within said window of interest.

6. The method of claim 1 wherein a group of windows of interest are selected in different areas of the image and information defining the group of windows is transmitted to the transmitting station to cause transmission to the receiving station of additional image data pertaining to all of said windows in said group.

7. The method of claim 1 wherein said additional image data is a transmission of the portion of the original digitized data set defining the image in the window of interest.

8. The method of claim 7 including the further steps of losslessly compressing the additional image data at the transmitting station before transmission, and decompressing the received losslessly compressed additional image data at the receiving station.

9. The method of claim 1 comprising the further steps of:

providing an input device permitting the user at the receiving station to select a direction of interest;

receiving a user selected direction of interest different from a direction of collection of the digitized image data set and transmitting the selected direction of interest to the transmitting station, following the display of the lossy decompressed image data set at the receiving station;

obtaining a new digitized image data set at the transmitting station, collected in the specified direction of interest; and repeating the steps of performing a lossy compression operation, transmitting the lossy compressed image data set, decompressing the image data set, and displaying the image data set using the new digitized image data set collected in the direction of interest before receiving the user selection of the window of interest.

10. The method of claim 1 wherein the transmitting station is located at a first geographic location and the receiving station is located at a second geographic location distinct from said first geographic location.

11. The method of claim 1 wherein the communications channel includes a transmission channel on a communications network linking a plurality of distant stations.

12. The method of claim 11 wherein the communications channel includes a telephone transmission link.

13. The method of claim 1 wherein the communications channel comprises a wireless communications link.

14. The method of claim 13 wherein the communications channel comprises a satellite communication link.

15. The method of claim 1 wherein the communications channel comprises a local area network link.

16. The method of claim 1 wherein said digitized image data set represents a single image and said window of interest specifies a portion of interest within said single image.

17. The method of claim 1 wherein said lossy decompressed image data set has the same number of pixels as the original digitized image data set.

18. The method of claim 1 wherein the user can selectively vary a shape of the selected window and said information transmitted to the transmitting station defining the window of interest includes information defining the selected shape of the window.

19. The method of claim 1 wherein said lossy decompressed image data set has the same pixel resolution as the digitized image data set prior to transmission.

20. The method of claim 1 comprising the further step of:
until the user requests enhancement of the window of interest to accurately reproduce the original image data, repeating the step of receiving a user selection of a window of interest, and in response to the selection, generating and transmitting a new lossy compressed image data set to provide a zoom image at the receiving station relating to the selected window of interest.

21. The method of claim 1 wherein the steps of receiving the user selection of the window of interest and transmitting information defining the window of interest to the transmitting station constitute the interactive instruction by the user to request an accurate reproduction of the original image data in the selected window of interest.

22. An interactive method of transmitting detailed image data to a user over a communications channel extending between a transmitting station and a receiving station, comprising the steps of:
transmitting a user request for image data to the transmitting station;
obtaining a digitized image data set in a computing device at the transmit fine station;
performing a lossy compression operation on the digitized image data set, using the transmitting station computing device, to produce a lossy compressed image data set;
transmitting the lossy compressed image data set to a computing device at the receiving station;
decompressing the lossy compressed image data set at the receiving station, using the receiving station computing device, to produce a lossy decompressed image data set;
displaying the lossy decompressed image data set on a display device visible to the user at the receiving station:
providing an input device permitting the user at the receiving station to select at least one window of interest within the displayed image data set;
monitoring the input device to receive a user selection of the window of interest and transmitting information defining the window of interest to the transmitting station;
transmitting, from the transmitting station to the receiving station, additional image data pertaining exclusively to the image within said window of interest;
using said additional image data, enhancing the displayed image within the window of interest to produce a display within the window of interest which accurately reproduces the original digitized image data set, wherein said additional image data is difference data defining changes required to correct errors in the lossy decompressed image data set arising from the lossy compression operation and subsequent decompression; and
inhibiting the performance of the steps of transmitting additional image data and enhancing the display image until the user interactively indicates that an accurate reproduction of the original image data is desired in the currently selected window of interest.

23. The method of claim 22 wherein said difference data is encoded in a variable length diagonal code prior to said transmission.

24. The method of claim 22 including the further steps of losslessly compressing the additional image data at the transmitting station before transmission, and decompressing the received losslessly compressed additional image data at the receiving station.

25. A system for interactively transmitting detailed image data over a communications channel extending between a transmitting station and a receiving station under the control of an end user, comprising:
transmitting station computing means for receiving an end user request for image data, obtaining an original digitized image data set at the transmitting station, said original image data set defining an image having a spatial resolution, performing a lossy compression operation on the digitized image data set to produce a lossy compressed image data set defining an image having the same said spatial resolution as the original image data set, and storing said lossy compressed image data set at the transmitting station;
transmitting means for transmitting the lossy compressed image data set to the receiving station;
receiving station computing means for receiving the lossy compressed image data set, decompressing the lossy compressed image data set to produce a lossy decompressed image data set, and displaying the lossy decompressed image data set as an image on a display device visible to the end user at the receiving station with the same said spatial resolution;

command receiving means for receiving a selection by the end user of at least one window of interest within the displayed image and transmitting information defining the window of interest to the transmitting station;

image updating means associated with the transmission station computing means for receiving said information defining the window of interest and transmitting, from the transmitting station to the receiving station, additional image data pertaining exclusively to the image within said window of interest;

update inhibiting means for receiving a user command at the receiving station indicating that an accurate reproduction of the original image data is desired in the currently selected window of interest, and until said command is received, inhibiting the operation of said image updating means to transmit said additional image data pertaining exclusively to the image within said window of interest; and window display enhancing means associated with said receiving station computing means for receiving said additional image data and, while maintaining the display of the window of interest at the same said spatial resolution, enhancing the displayed image within the window of interest to produce a display within the window of interest which accurately reproduces the original image data.

26. The system of claim 25 wherein the means for transmitting a user request includes means for specifying desired initial image transmission parameters.

27. The system of claim 26 wherein the means for transmitting a user request includes means for specifying a desired image quality of the lossy compressed image data set.

28. The system of claim 27 wherein the user request for image data specifies a variable data compression ratio for initial data transmission.

29. The system of claim 26 wherein the means for transmitting a user request includes means for specifying a spectral response for the initial image transmission and means for specifying a different spectral response for a subsequent image transmission of data within the selected window of interest.

30. The system of claim 25 wherein the command receiving means includes means for receiving end user selections of a window group comprising a plurality of windows of interest in different areas of the image and transmitting specifications of said group of windows of interest to the transmitting station.

31. The system of claim 25 wherein the image updating means comprises means for transmitting a portion of the original digitized data set defining the image in the window of interest as said additional data.

32. The system of claim 31 wherein the image updating means further comprises means for losslessly compressing the additional image data at the transmitting station before transmission, and the window display enhancing means further includes means for decompressing received losslessly compressed additional image data at the receiving station.

33. The system of claim 25 further comprising:

reorientation control means associated with the receiving station for receiving a selection of a direction of interest following display of the lossy compressed image data set; and direction adjustment means associated with the transmitting station computing means for receiving a user selected direction of interest different from a direction of collection of the digitized image data set, obtaining a new digitized image data set collected in the specified direction of interest, performing a lossy compression operation on the new digitized image data set, and activating the transmitting means to transmit results of the lossy compression operation on the new digitized image data set to the receiving station.

34. The system of claim 25 wherein the transmitting station is located at a first geographic location and the receiving station is located at a second geographic location distinct from said first geographic location.

35. The system of claim 24 wherein the communications channel includes a telephone transmission link.

36. The system of claim 25 wherein the communications channel includes a transmission channel on a communications network linking a plurality of distant stations.

37. The system of claim 25 wherein the communications channel comprises a wireless communications link.

38. The system of claim 37 wherein the communications channel comprises a satellite communication link.

39. The system of claim 25 wherein the communications channel comprises a local area network link.

40. The system of claim 25 wherein said digitized image data set represents a single image and said window of interest specifies a portion of interest within said single image.

41. The system of claim 25 wherein said lossy decompressed image data set has the same number of pixels as the original digitized image data set.

42. The system of claim 25 wherein the command receiving means comprises window shape varying means for receiving a user instruction to vary a shape the selected window and transmitting information defining the selected shape of the window of interest to the transmitting station.

43. The system of claim 25 wherein said lossy decompressed image data set has the same pixel resolution as the digitized image data set prior to transmission.

44. The system of claim 25 further comprising zooming means, operating at the transmitting station, for receiving a zoom command from the user and sequentially actuating the image updating means and window enhancement means to generate and transmit a new lossy compressed zoom image to the receiving station relating to the currently selected window of interest.

45. The system of claim 25 wherein the update inhibiting means is connected with the command receiving means such that the operation of the command receiving means to receive the user selection of the window of interest and transmit information defining the window of interest to the transmitting station constitutes an interactive instruction by the user to request an accurate reproduction of the original image data in the selected window of interest.

46. A system for interactively transmitting detailed image data over a communications channel extending between a transmitting station and a receiving station under the control of an end user, comprising:

transmitting station computing means for receiving an end user request for image data, obtaining an original digitized image data set at the transmitting station and performing a lossy compression operation on the digitized image data set to produce a lossy compressed image data set;

transmitting means for transmitting the lossy compressed image data set to the receiving station;

receiving station computing means for receiving the lossy compressed image data set, decompressing the lossy compressed image data set to produce a lossy decompressed image data set and displaying the lossy decompressed image data set as an image on a display device visible to the end user at the receiving station;

command receiving means for receiving a selection by the end user of at least one window of interest within the displayed image and transmitting information defining the window of interest to the transmitting station;

image updating means associated with the transmission station computing means for receiving said information defining the window of interest and transmitting, from the transmitting station to the receiving station, additional image data pertaining exclusively to the image within said window of interest; wherein the image updating means further comprises difference data computing means for computing difference data defining changes required to correct errors in the lossy decompressed image data set arising from the lossy compression operation and subsequent decompression, and said image updating means includes means for transmitting said difference data as said additional data;

update inhibiting means for receiving a user command at the receiving station indicating that an accurate reproduction of the original image data is desired in the currently selected window of interest; and until said command is received, inhibiting the operation of said image updating means to transmit said additional image data pertaining exclusively to the image within said window of interest; and window display enhancing means associated with said receiving station computing means for receiving said difference data and enhancing the displayed image within the window of interest to produce a display within the window of interest which accurately reproduces the original image data.

47. The system of claim 46 wherein the image updating means further comprises encoding means for encoding said difference data in a variable length diagonal code prior to said transmission.

48. The system of claim 46 wherein the image updating means further comprises means for losslessly compressing the additional image data at the transmitting station before transmission, and the window display enhancing means further includes means for decompressing received losslessly compressed additional image data at the receiving station.

49. An interactive method of transmitting detailed image data to a user over a communications channel extending between a transmitting station and a receiving station, comprising the steps of:

transmitting a user request for image data to the transmitting station;

obtaining a digitized image data set in a computing device at the transmitting station;

performing a lossy compression operation on the digitized image data set, using the transmitting station computing device, to produce a lossy compressed image data set;

storing the transmitted lossy compressed image data set at the transmitting station;

transmitting the lossy compressed image data set to a computing device at the receiving station;

decompressing the lossy compressed image data set at the receiving station, using the receiving station computing device, to produce a lossy decompressed image data set;

displaying the lossy decompressed image data set on a display device visible to the user at the receiving station;

providing an input device permitting the user at the receiving station to select at least one window of interest within the displayed image data set;

monitoring the input device to receive a user selection of the window of interest and transmitting information defining the window of interest to the transmitting station;

transmitting, from the transmitting station to the receiving station, additional image data pertaining exclusively to the image within said window of interest;

using said additional image data, enhancing the displayed image within the window of interest to produce a display within the window of interest which accurately reproduces the original digitized image data set; and until the user indicates that an accurate reproduction of the original image data is desired in the currently selected window of interest, inhibiting the performance of the additional image data transmission and display enhancing steps and iteratively: generating and transmitting, from the transmitting station to the receiving station, a new lossy compressed image data set relating to the window of interest, decompressing and displaying the lossy compressed image data set for the new image data set relating to the window of interest, and receiving user modifications of the specification of the window of interest.

50. A system for interactively transmitting detailed image data over a communications channel extending between a transmitting station and a receiving station under the control of an end user, comprising:

transmitting station computing means for receiving an end user request for image data, obtaining an original digitized image data set at the transmitting station and performing a lossy compression operation on the digitized image data set to produce a lossy compressed image data set;

storage means for storing the transmitted lossy compressed image data set at the transmitting station;

transmitting means for transmitting the lossy compressed image data set to the receiving station;

receiving station computing means for receiving the lossy compressed image data set, decompressing the lossy compressed image data set to produce a lossy decompressed image data set, and displaying the lossy decompressed image data set as an image on a display device visible to the end user at the receiving station;

command receiving means for receiving a selection by the end user of at least one window of interest within the displayed image and transmitting information defining the window of interest to the transmitting station;

image updating means associated with the transmission station computing means for receiving said information defining the window of interest and transmitting, from the transmitting station to the receiving station, additional image data pertaining exclusively to the image within said window of interest; and window display enhancing means associated with said receiving station computing means for receiving said additional image data and enhancing the displayed image within the window of interest to produce a display within the window of interest which accurately reproduces the original image data; and window selection iterating means associated with the transmitting station for receiving the window of interest information from the command receiving means, and until the user indicates that an accurate reproduction of the original image data is desired within the currently selected window of interest, iteratively inhibiting the operation of the image updating means and window display enhancing means, generating a new lossy compressed image data set defining an image within the window of interest, transmitting the new lossy compressed image data set to the receiving station computing means for display, and receiving a new window of interest selection from the user.

51. An interactive method of transmitting detailed image data to a user over a communications channel extending between a transmitting station and a receiving station, comprising the steps of:

transmitting a user request for image data to the transmitting station;

obtaining a digitized image data set in a computing device at the transmitting station;

performing a lossy compression operation on the digitized image data set, using the transmitting station computing device, to produce a lossy compressed image data set;

storing the lossy compressed image data set at the transmitting station;

transmitting the lossy compressed image data set to a computing device at the receiving station;

decompressing the lossy compressed image data set at the receiving station, using the receiving station computing device, to produce a lossy decompressed image data set;

displaying the lossy decompressed image data set on a display device visible to the user at the receiving station;

providing an input device permitting the user at the receiving station to select at least one window of interest within the displayed image data set;

monitoring the input device to receive a user selection of the window of interest and transmitting information defining the window of interest to the transmitting station;

transmitting, from the transmitting station to the receiving station, additional image data pertaining exclusively to the image within said window of interest;

using said additional image data, enhancing the displayed image within the window of interest to produce a display within the window of interest which accurately reproduces the original digitized image data set; and until the user interactively indicates that an accurate reproduction of the original image data is desired in the currently selected window of interest, inhibiting the performance of the additional image data transmission and display enhancing steps.

* * * * *